(12) United States Patent
Bontus et al.

(10) Patent No.: US 11,995,746 B2
(45) Date of Patent: May 28, 2024

(54) SYSTEM FOR RECONSTRUCTING AN IMAGE OF AN OBJECT

(71) Applicant: KONINKLIJKE PHILIPS N.V., Eindhoven (NL)

(72) Inventors: Claas Bontus, Hamburg (DE); Thomas Koehler, Norderstedt (DE); Bernhard Brendel, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 337 days.

(21) Appl. No.: 17/312,993

(22) PCT Filed: Dec. 9, 2019

(86) PCT No.: PCT/EP2019/084111
§ 371 (c)(1),
(2) Date: Jun. 11, 2021

(87) PCT Pub. No.: WO2020/120346
PCT Pub. Date: Jun. 18, 2020

(65) Prior Publication Data
US 2022/0076461 A1 Mar. 10, 2022

(30) Foreign Application Priority Data
Dec. 12, 2018 (EP) .................................. 18211948

(51) Int. Cl.
*G06T 11/00* (2006.01)
(52) U.S. Cl.
CPC ....... *G06T 11/006* (2013.01); *G06T 2211/432* (2013.01)
(58) Field of Classification Search
CPC ................. G06T 11/001; G06T 11/006; G06T 2207/20212; G06T 2207/20221; G06T 2211/432; A61B 6/5205
See application file for complete search history.

(56) References Cited

U.S. PATENT DOCUMENTS

| | | | |
|---|---|---|---|
| 8,107,708 B2 | 1/2012 | Hoppe et al. | |
| 8,175,361 B2 | 5/2012 | Kunze et al. | |
| 9,196,061 B2 | 11/2015 | Hsieh et al. | |
| 9,462,988 B2 | 10/2016 | Hansis | |
| 2004/0066911 A1 | 4/2004 | Hsieh et al. | |
| 2005/0123215 A1 | 6/2005 | Man | |
| 2007/0116344 A1 | 5/2007 | Hsieh et al. | |
| 2007/0253523 A1 | 11/2007 | Zamyatin | |
| 2009/0087055 A1 | 4/2009 | Maltz | |
| 2014/0126784 A1 | 5/2014 | Hsieh et al. | |
| 2020/0126272 A1* | 4/2020 | Baer-Beck et al. | A61B 6/5247 |

FOREIGN PATENT DOCUMENTS

DE 102014210420 A1 12/2015
JP 2013116213 A 6/2013

OTHER PUBLICATIONS

PCT International Search Report, International application No. PCT/EP2019/084111, dated Feb. 26, 2020.
Hsieh J. et al., "A Novel Reconstruction Algorithm to Extend the CT Scan Field-of-View", Medical Physics, 31., 9, pp. 2385-2391, Sep. 2005.
Hsieh S.S. et al., "An Algorithm to Estimate the Object Support in Truncated Images", Medical Physics, 41, 7, pp. 071908-1 to 071908-112385-2391, Jul. 2014.
Batenburg K.J. et al., "DART: A Practical Reconstruction Algorithm for Discrete Tomography", IEEE Transactions on Image Processing, vol. 20, No. 9, pp. 2542-2553, Sep. 2011.
Ohnesorge B. et al., "Efficient Correction for CT Image Artifacts Caused by Objects Extending Outside the Scan Field of View", Medical Physics, vol. 27, No. 1, pp. 39-46, Jan. 2000.
Zamyatin A. et al., "Extension of the Reconstruction Field of View and truncation Correction Using Sinogram Decomposition", Medical Physics, 34, 5, pp. 1593-1604, May 2007.
Zhuge X. et al., "TVR-DART: A More Robust Algorithm for Discrete Tomography From Limited Projection Data with Automated Gray Value Estimation", IEEE Transactions on Image Processing, vol. 25, No. 1, pp. 455-467, Jan. 2016.
Hsieh J. et al., "Computed Tomography: Principles, Design, Artifacts, and Recent Advances", Third Edition, SPIE, Bellingham, vol. PM259, Chapter 3—Section 3.6.3-3.6.4 and Chapter 8—Section 8.3, 2015.

* cited by examiner

*Primary Examiner* — Andrew W Johns
(74) *Attorney, Agent, or Firm* — Larry Liberchuk

(57) ABSTRACT

The invention relates to a system for reconstructing an image of an object. The system (100) comprises means (110) providing projection data acquired by an imaging unit, like a CT system, with an FOV, means (120) generating estimated image data indicative of a part of an object (20) located outside the FOV (210), means (130) estimating virtual projection data based on virtual settings of a virtual imaging unit comprising a virtual FOV, means (140) generating fused projection data by fusing the provided projection data with the virtual projection data, and means (150) reconstructing a final image. This allows basing the reconstruction on a complete set of projection information for the object and thus providing an image with a high image quality.

15 Claims, 8 Drawing Sheets

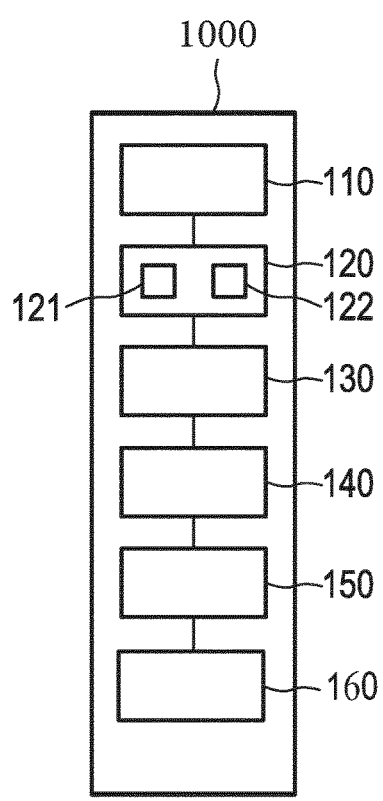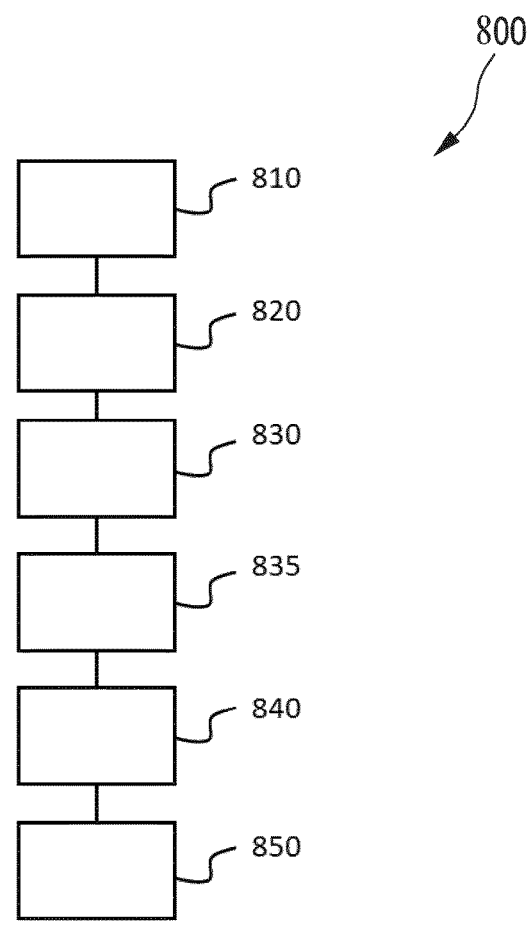
FIG. 8                    FIG. 9

SYSTEM FOR RECONSTRUCTING AN IMAGE OF AN OBJECT

FIELD OF THE INVENTION

The invention relates to a system, a method and a computer program for reconstructing an image of an object.

BACKGROUND OF THE INVENTION

Modern imaging systems, for instance, CT imaging systems, often comprise a field of view smaller than the bore size of the imaging unit, due to a limited extent of the detector in angular direction. If an object imaged by the imaging unit comprises parts extending beyond the field of view, the reconstruction of the acquired projection data will lead to artifacts of the image, particularly in regions of the image corresponding to the parts of the object extending beyond the field of view of the imaging unit. These artifacts will be particularly emphasized when high attenuating objects, like bone or metal objects, are located outside the field of view of the imaging unit.

SUMMARY OF THE INVENTION

It is an object of the present invention to provide a system, a method and a computer program for reconstructing an image of an object which allow for an improved image quality of images of objects extending beyond a field of view of an imaging system.

In a first aspect of the present invention a system for reconstructing an image of an object is presented, wherein the system comprises a) a projection data providing unit for providing projection data of an object, which has been acquired by using an imaging unit comprising an imaging field of view (FOV), b) an estimated image data generation unit for generating estimated image data indicative of a part of the object located outside the imaging FOV based on the provided projection data, c) a virtual projection data estimation unit for estimating virtual projection data, wherein the virtual projection data is estimated by forward projecting the estimated image data based on virtual settings of a virtual imaging unit, wherein the virtual imaging unit comprises a virtual FOV, wherein the part of the object located outside the imaging FOV is located inside the virtual FOV, d) a data fusion unit for generating fused projection data based on a fusion of the provided projection data with the virtual projection data, and e) a final image data reconstruction unit for reconstructing a final image of the object based on the fused projection data.

Since the estimated image data generation unit generates estimated image data that is indicative of a part of the object located outside the imaging FOV based on the provided projection data, the information with regard to the part of the object being located outside the imaging FOV that is provided in the provided projection data can be used to determine an estimate of the object located outside the imaging FOV, i.e. can be used to estimate an image, i.e. image data, of the part of the object located outside the imaging FOV. Moreover, since the virtual projection data estimation unit estimates virtual projection data based on the estimated image data, wherein the virtual projection data is estimated based on a virtual imaging unit comprising a virtual FOV that includes parts of the object located outside the imaging FOV, a full set of data of the object can be acquired including full angular information of the estimated part of the object located outside the imaging FOV. Since further the estimated virtual projection data is fused with the provided projection data, wherein a final image data is reconstructed based on the fused projection data, the reconstruction can be based on projection data comprising a complete set of projection information for the object, wherein for each projection data the most accurate projection data from the provided projection data and the virtual projection data can be chosen. Thus, a truncation of the finally reconstructed image can be decreased and an image with high image quality can be provided.

The projection data providing unit is adapted to provide projection data of an object. The projection data providing unit can be, for instance, directly connected to an imaging unit acquiring projection data of the object and directly provide the projection data acquired by the imaging unit. Moreover, the projection data providing unit can also be a part of an imaging unit acquiring the projection data. Alternatively, the projection data providing unit can be separate from the imaging unit and/or can be connected, for instance, to a storage unit storing projection data of the object that has been acquired by the imaging unit. Moreover, the projection data providing unit can itself be configured as a storage unit storing the projection data of the object. The object can be any object imaged by the imaging unit, for instance, a human being, an animal or an inanimate object, like a suitcase. In a preferred embodiment, the object is a patient and the imaging unit is a medical imaging unit for acquiring medical imaging data.

The imaging unit can be any imaging unit comprising an imaging FOV smaller than a bore size of the imaging unit. An imaging FOV of an imaging unit is defined as an area for which the imaging unit can acquire a full angular set of projection data, wherein the full angular set of projection data encompasses a sufficiently high number of projection data sets spanning over at least an angular range of 180 degrees for reconstructing a respective image. In an embodiment, the imaging unit comprises a detector with an angular extent, wherein the angular extent of the detector determines the imaging FOV of the imaging unit. In a preferred embodiment, the imaging unit is a CT system, even more preferred a medical CT system.

The projection data provided by the projection data providing unit comprises projection data indicative of the part of the object located inside the imaging FOV and projection data indicative of at least a part of the object located outside the imaging FOV. Preferably, the provided projection data comprises a full set of angular information on the part of the object located inside the FOV and partial angular information on at least a part of the object located outside the FOV.

The estimated image data generation unit is adapted to generate an estimated image data that is indicative of the part of the object located outside the imaging FOV based on the provided projection data. In particular, the estimated image data generation unit is adapted to use the projection data indicative of at least a part of the object located outside the imaging FOV, i.e. to use information on the part of the object located outside the FOV, provided in the provided projection data to generate the estimated image data, i.e. to estimate image characteristics of at least a part of the object located outside the FOV. The estimated image data generation unit can use any kind of method that is suitable to generate the estimated image data based on the information on the part of the object located outside the FOV provided in the projection data. Moreover, the estimated image data generation unit can further be adapted to use additional information on the part of the object located outside the FOV, for instance, a known composition, structure or boundary.

The virtual projection data estimation unit is adapted to estimate virtual projection data based on a virtual imaging unit and the estimated image data. The virtual imaging unit comprises a virtual FOV that includes the part of the object that is located outside the imaging FOV. For instance, the virtual imaging unit can comprise a virtual detector, wherein the virtual detector has a greater angular extent than the imaging detector of the imaging unit. Virtual projection data is estimated by forward projecting the estimated image data based on virtual settings of the virtual imaging unit. The virtual imaging settings are preferably, for instance, the same as or similar to the imaging settings of the imaging unit that has been used to acquire the projection data. An exemplary method for forward projecting the estimated imaging data can be found in the book "Computed Tomography: Principles, Design, Artifacts, and Recent Advances" by J. Hsieh, Third Edition, SPIE, Bellingham, volume PM259 (2015), but also other forward projection methods can be contemplated. Preferably, the virtual projection data comprises an estimate of a full angular set of projection data of at least a part of the object located outside the imaging FOV, due to the virtual FOV including the part of the object located outside the imaging FOV.

The data fusion unit generates fused projection data based on a fusion of the provided projection data and the virtual projection data. In a preferred embodiment, the provided projection data and the virtual projection data are fused such that the virtual projection data is used as basis for the fused projection data, wherein projection data of the provided projection data is used in the fused projection data for all projection data of the virtual projection data for which projection data of the provided projection data exists. Thus, in this embodiment, projection data of the virtual projection data for which projection data of the provided projection data exists is replaced by the respective projection data of the provided projection data. In another preferred embodiment, the provided projection data and the virtual projection data are fused by extending the provided projection data by the virtual projection data. In a further preferred embodiment, the virtual projection data is scaled before fusion with the provided projection data, wherein the virtual projection data is scaled such that a difference between projection data of the virtual projection data and projection data of the provided projection data corresponding to a same projection data point, i.e. corresponding to a same point in projection data space, is minimized. Scaling the virtual projection data before fusion with the projection data leads to a reduction of transitional artifacts in the final reconstructed image.

The final image data reconstruction unit is adapted to then reconstruct the final image of the object based on the fused projection data, wherein any known reconstruction algorithm can be used for reconstructing the final image. Preferably a filtered back-projection algorithm is used for reconstructing the final image.

In an embodiment, the generating of estimated image data comprises a) generating a first image based on the provided projection data, wherein the first image is indicative of a boundary of a part of the object located outside the imaging FOV, generating a second image based on the provided projection data, wherein the second image is indicative of a highly attenuating object in the part of the object located outside the imaging FOV, and fusing the first image with the second image, or b) reconstructing the provided projection data based on an algorithm suitable for reconstructing incomplete sampled projection data.

In other words, the estimated image data generation unit is configured to a) generate the first image based on the provided projection data and to generate the second image based on the provided projection data and to fuse the first image with the second image. The first image is indicative of a boundary of a part of the object located outside the imaging FOV and the second image is indicative of a highly attenuating object in the part of the object located outside the imaging FOV.

Or, the estimated image data generation unit is configured to reconstruct the provided projection data based on an algorithm suitable for reconstructing incomplete sampled projection.

In an embodiment, the estimated image data generation unit is adapted to generate the first image based on the provided projection data, for instance, using a reconstruction algorithm that provides a good estimate of a boundary of a part of an object located outside an imaging FOV. Moreover, if the object is a human being or an animal, preferably the estimated image data generation unit is adapted to generate the first image based on the provided projection data, wherein the first image is further indicative of soft tissue, like muscle or organ tissue, in a part of the object located outside the imaging FOV. Preferably, the estimated image data generating unit is adapted to generate the first image based on an algorithm suitable for generating, i.e. reconstructing, incomplete sample projection data. In a more preferred embodiment, a discrete algebraic reconstruction tomography (DART) algorithm can be used for reconstructing the provided projection data into the first image. Alternatively, the first image can be reconstructed based on a support reconstruction algorithm as, for instance, described in the article "A novel reconstruction algorithm to extend the CT scan field-of-view" by J. Hsieh et al., Medical Physics, volume 31, pages 2385-2391 (2004). Preferably, the first image is generated based on an assumption that the part of the object located outside the imaging FOV is homogenous.

The second image can be generated based on the provided projection data using any known reconstruction algorithm that is suitable for reconstructing highly attenuating objects. Highly attenuating objects are, for instance, objects like bone or metal. In one embodiment, for generating the second image based on the provided projection data, a water cylinder fitting algorithm is used. Such an algorithm is, for instance, described in U.S. Pat. No. 9,196,061 B2. In another embodiment, the estimated image data generation unit is adapted to use as second image a final image generated by the final image data reconstruction unit based on estimated image data generated according to option b), i.e. generated based on reconstructing the provided projection data based on an algorithm suitable for reconstructing incomplete sampled projection data. Accordingly, virtual projection data is generated from the first image and fused with the provided projection data, wherein the fused projection data is reconstructed to a final image indicative of highly attenuating objects outside the FOV. Thus, in this embodiment, the system is adapted to first generate a first final image for the provided projection data using option b) and to provide the first final image as second image to the estimated image data generation unit, wherein the system is adapted to generate a second final image based on option a).

Moreover, in this embodiment, it is preferred that the estimated image generation unit is further adapted to segment the second image, wherein the second image is fused with the first image by replacing parts of the first image with at least one segment indicative of the highly attenuating object in the part of the object located outside the imaging FOV. The segmentation can be performed using any known segmentation algorithm for segmenting objects in an image.

Preferably, the segmentation is performed by using thresholding, wherein an image value threshold is defined and all voxels of the second image having an image value greater than the image value threshold are considered as belonging to a highly attenuating object segment. It is further preferred that the second image is fused with the first image such that image values of voxels in an area of the first image corresponding to an area in the second image being identified during the segmentation as an area belonging to a highly attenuating object are replaced with image values of voxels in that area of the second image.

An advantage of providing a first image indicative of a boundary of the part of the object located outside the imaging FOV and a second image indicative of a highly attenuating object in the part of the object located outside the imaging FOV and fusing the first and the second image is that artifacts caused by highly attenuating objects in the first and the second image can be avoided in the fused image, such that the fused image gives a very accurate estimate of the part of the object located outside the FOV. Using this very accurate estimate, i.e. the fused image, as basis for generating a final image, for instance, by forward projecting the fused image, i.e. estimated image data, to generate virtual projection data, fusing the virtual projected data with the provided projection data, and reconstructing the fused projection data, a very accurate final image of the object comprising less artifacts can be generated.

In another embodiment, the estimated image data generation unit is adapted to reconstruct the provided projection data based on an algorithm suitable for reconstructing incomplete sampled projection data. An algorithm suitable for reconstructing incomplete sample projection data has the advantage that the algorithm can provide a very accurate estimate of the part of the object outside the imaging FOV, although the projection data does not provide a full angular set of projection data for the object located outside the imaging FOV.

Preferably, the reconstruction of the provided projection data is performed based on an iterative discrete tomography algorithm. An iterative discrete tomography algorithm is based on the assumption that an object to be reconstructed consists of a limited set of absorption coefficients, i.e. image values. In an embodiment, it is assumed that the part of the object located outside the FOV comprises two absorption coefficients, i.e. two imaging values. In another embodiment, it is assumed that the part of the object located outside the FOV comprises three absorption coefficients, i.e. three imaging values. The absorption coefficients can be assumed to be the absorption coefficients of air and water, or air and fat, or air, water and bone, or air, fat and bone. Preferably, the absorption coefficients are assumed to be the absorption coefficients of air, fat and bone. More preferably, the iterative discrete tomography algorithm is a DART algorithm or a TVR-DART algorithm. A detailed description of a DART algorithm or a TVR-DART algorithm can be found, for instance, in the articles "DART: A Practical Reconstruction Algorithm for Discrete Tomography" by K. Batenburg et al., IEEE Transactions on Image Processing, volume 20, pages 2542-2553 (2011) and "TVR-DART: A More Robust Algorithm for Discrete Tomography From Limited Projection Data With Automated Gray Value Estimation" by X. Zhuge et. al., IEEE Transactions on Image Processing, volume 25, page 455-468 (2016). It is further preferred that the DART algorithm or TVR-DART algorithm is used in a modified way. Preferably, in each iterative step of the DART algorithm or TVR-DART algorithm iterative image data is generated and a part of the iterative image data in a region corresponding to the imaging FOV or a region included in the imaging FOV is set to an image value of zero. Since the estimated image data should be indicative of the part of the object located outside the FOV, image data indicative of at least a part of the object located inside the FOV can be neglected, i.e. set to zero, during the reconstruction. This allows for a reconstruction allowing for less computational effort. In a preferred embodiment, the iterative discrete tomography algorithm is a DART algorithm. Further preferred, in each iterative step of the DART algorithm iterative image data is generated and a set of free pixels is determined in the iterative image data, wherein the set of free pixels is restricted to a region corresponding to a region outside the imaging FOV or to a region outside a region included in the imaging FOV. A DART algorithm uses assumptions on the imaging values expected in the reconstructed image, wherein during the reconstruction the image is segmented in the regions comprising the expected image values. Pixels on the boundary between the segments plus a certain number of randomly chosen pixels are defined as free pixels. The free pixels are the only pixels that are updated during the iteration of the DART algorithm. Thus, in the modified DART algorithm, according to the above embodiment, only pixels are determined and updated that belong to a region corresponding to a region outside the imaging FOV.

It is further preferred that the estimated image data generation unit is adapted to generate the estimated image data based on the first option, i.e. option a), when it is expected that a part of the object located outside the FOV comprises a highly attenuating object, and to generate the estimated image data based on the second option, i.e. option b), in all other cases. The estimated image data generation unit can be adapted to receive the expectation of a highly attenuating object from a user or can be adapted to determine the presence of a highly attenuating object from the provided projection data.

In an embodiment, the estimated image data generation unit is further adapted to generate the estimated image data based on the fused projection data provided by the data fusion unit. Accordingly, the estimated image data generation unit, the virtual projection data estimation unit, and the data fusion unit can be used to iterate the provided projection data, wherein in each iteration step the fused projection data is provided to the estimated image data generation unit for generating new estimated image data, wherein the new estimated image data is then used as a basis by the virtual projection data estimation unit for estimating new virtual projection data, wherein the data fusion unit is adapted also to fuse the new virtual projection data with the projection data to generate new fused projection data. Moreover, it is preferred that the system further comprises a residuum determination unit for determining a residuum between the fused projection data and new fused projection data, wherein if the residuum is smaller than a predetermined threshold, the new fused projection data is considered as the final fused projection data and the final image data reconstruction unit is adapted to reconstruct the final image based on the final fused projection data. Moreover, the final image can be used as an input image for a maximum likelihood image reconstruction (MLIR) method. In this embodiment, it is preferred that the MLIR reconstruction is further based on the provided projection data.

In an embodiment, the estimated image data generation unit further comprises a) an image data isolation unit for isolating image data indicative of a part of the object located within the imaging FOV, wherein for isolating the isolated image data a truncated image is reconstructed from the projection data and the isolated image data is isolated from the truncated image, b) an outside projection data generation unit for generating outside projection data indicative of a part of the object located outside the imaging FOV, wherein for generating the outside projection data the isolated image data is forward projected and the outside projection data is generated based on the forward projected isolated image data and the provided projection data, wherein the estimated image data is generated based on the outside projection data.

Since the estimated image data generation unit generates the estimated image data based on the outside projection data, the estimated image data does not have to be generated based on the whole of the provided projection data, but only on a part of the provided projection data being indicative of a part of the object located outside the imaging FOV. This leads to a decrease in the amount of data that has to be processed and therefore can increase the computational speed and thus reduce the computational time needed for reconstructing a final image of the object. Preferably, for reconstructing the truncated image from the projection data, a filtered back projection algorithm is used. Moreover, it is preferred that the provided projection data is modified before the reconstruction, such that artifacts inside the imaging FOV are minimized. This can preferably be achieved by using a point reflection algorithm, as described, for instance, in the article "Efficient correction for CT image artifacts caused by objects extending outside the scan field of view" by B. Ohnesorge et al., Medical Physics, volume 27, pages 39-46 (2000). In an embodiment, the estimated image data generation unit is adapted to generate the estimated image data based on a DART or TVR-DART algorithm, wherein in each iterative step of the algorithm a part of the iterative image data corresponding to a region corresponding to the isolated image data or to a region included in the region corresponding to the isolated image data is set to zero.

In a preferred embodiment, the image data isolation unit is adapted to isolate the isolated image data from the truncated image by isolating a region of the truncated image corresponding to the imaging FOV or a region included in the imaging FOV. If the imaging unit used for acquiring the provided projection data is a CT system, the region of the imaging FOV of the CT system will refer to a circular or cylindrical region around the middle axis of the CT system comprising a predetermined radius. A circular or cylindrical FOV region of the imaging unit corresponds to a circular or cylindrical FOV region in a reconstructed image of the imaging unit, wherein the corresponding region in the reconstructed image has a corresponding predetermined radius. Preferably, in this case the isolated image data corresponds to a region of the truncated image being a circular or cylindrical region with a radius being smaller or equal to the corresponding radius of the FOV region in the truncated image. Preferably, the radius of the isolated region is a few percent smaller than the corresponding radius of the FOV region in the truncated image. In a most preferred embodiment, the radius of the isolated region is about 10 mm smaller than the corresponding radius of the FOV region in the truncated image.

In a further preferred embodiment, the image data isolation unit is adapted to forward project the isolated image data based on imaging settings corresponding to the imaging settings of the imaging unit that have been used during the acquisition of the projection data, and the outside projection data generation unit is adapted to generate the outside projection data based on subtracting the forward projected isolated image data from the provided projection data. The imaging settings used for forward projecting comprise at least one of a detector size, a table pitch, and a number of projections. Also other imaging settings can be contemplated.

In an embodiment, the virtual imaging unit used for forward projecting the estimated image data comprises a virtual detector, wherein the virtual detector comprises an increased angular range compared to a detector of the imaging unit that has been used for acquiring the projection data such that the virtual FOV is increased due to the increased angular range. It is further preferred that, if the imaging unit is a CT system, the virtual detector of the virtual imaging unit comprises virtual detector elements extending beyond detector elements of the detector of the imaging unit in a forward and backward angular direction. But, also other extensions of the virtual detector with respect to the detector of the imaging unit can be contemplated, for instance, that the virtual detector is only extended in the forward or backward angular direction.

In an embodiment, the system for reconstructing an image of an object, further comprises a slice thickness determination unit. The slice thickness determination unit is configured for determining an imaging FOV slice thickness and a virtual FOV slice thickness. The imaging FOV slice thickness corresponds to a slice thickness of projection data in the imaging FOV. The virtual FOV slice thickness corresponds to a slice thickness of virtual projection data in the virtual FOV.

The slice thickness determination unit is further configured to set the virtual FOV slice thickness bigger than the imaging FOV slice thickness. In alternative wording, the slice thickness determination unit is configured to set the imaging FOV slice thickness smaller than the virtual FOV slice thickness.

The data fusion unit is configured to fuse projection data that corresponds to the imaging FOV slice thickness with virtual projection data that corresponds to the imaging FOV slice thickness value, where said latter slice thickness is larger than said former slice thickness.

This allows the final data reconstruction unit to generate a final image where projection data in the imaging FOV is displayed at a smaller slice thickness than virtual projection data in the virtual FOV.

In other words, it allows generating and displaying a final image wherein in an inner region of the final image, data is projected with a low slice thickness. Data in an outer region of the final image is projected with a high slice thickness. The inner region corresponds with the imaging FOV and the outer region corresponds with the virtual FOV. Data in the inner region corresponds with projection data. Data in the outer region corresponds with virtual projection data.

This reduces artefacts in the virtual FOV/outer region as here use can be made of a higher slice thickness.

Preferably, the final data reconstruction unit is configured to reconstruct a final image of the object, wherein the projection data is reconstructed over an imaging FOV slice thickness and the virtual projection data is reconstructed over a virtual FOV slice thickness, wherein the imaging FOV slice thickness is smaller than the virtual FOV slice thickness.

Having an imaging FOV slice thickness that is smaller than a virtual FOV slice thickness has as advantage that in the virtual FOV artefacts may be reduced to a minimum while in the imaging FOV the final image may still be displayed with a desired slice thickness.

In a further aspect of the present invention a method for reconstructing an image of an object is presented, wherein the method comprises the steps of a) providing projection data of an object, wherein the projection data has been acquired by using an imaging unit comprising an imaging FOV, b) generating estimated image data indicative of a part of the object located outside the imaging FOV based on the provided projection data, c) estimating virtual projection data by forward projecting the estimated image data based on virtual settings of a virtual imaging unit, wherein the virtual imaging unit comprises a virtual FOV, wherein the part of the object located outside the imaging FOV is located inside the virtual FOV, d) generating fused projection data based on a fusion of the provided projection data with the virtual projection data, e) reconstructing the final image of the object based on the fused projection data.

In a further aspect of the present invention a computer program for reconstructing an image of an object is presented, wherein the computer program comprises program code means for causing the system of claim 1 to carry out the steps of the method as defined in claim 14 when the computer program is run on a computer controlling the system.

It shall be understood that the system of claim 1, the method of claim 14 and the computer program of claim 15 for reconstructing an image of an object have similar and/or identical preferred embodiments, in particular as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 8 shows schematically and exemplarily further embodiment of a system for reconstructing an image of an object, and FIG. 9 shows a flowchart exemplarily illustrating this further embodiment of a method for reconstructing an image of an object.

DETAILED DESCRIPTION OF EMBODIMENTS

Figure 1:
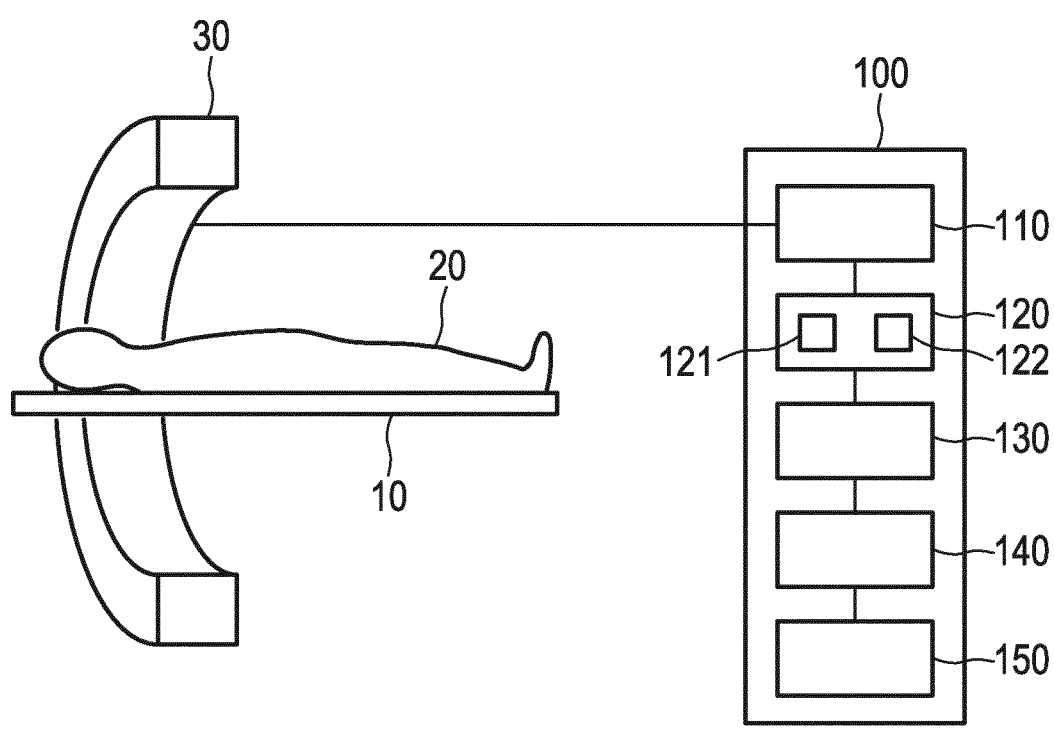
FIG. 1 shows schematically and exemplarily an embodiment of a system for reconstructing an image of an object.

FIG. 1 shows schematically and exemplarily an embodiment of a system for reconstructing an image of an object. In this embodiment, the system 100 is adapted for reconstructing medical images of a patient 20 lying on a support means 10 like a patient table. The system comprises a projection data providing unit 110 for providing projection data acquired by an imaging unit 30 imaging the patient. In this embodiment, the imaging unit 30 is a CT imaging system, wherein the CT imaging system is connected to the projection data providing unit 110 to provide projection data that has been acquired by the CT imaging system to the projection data providing unit 110. The imaging unit 30, i.e. the CT imaging system, comprises an imaging FOV 210, as will be explained in greater detail in accordance with FIG. 2.

Figure 2:
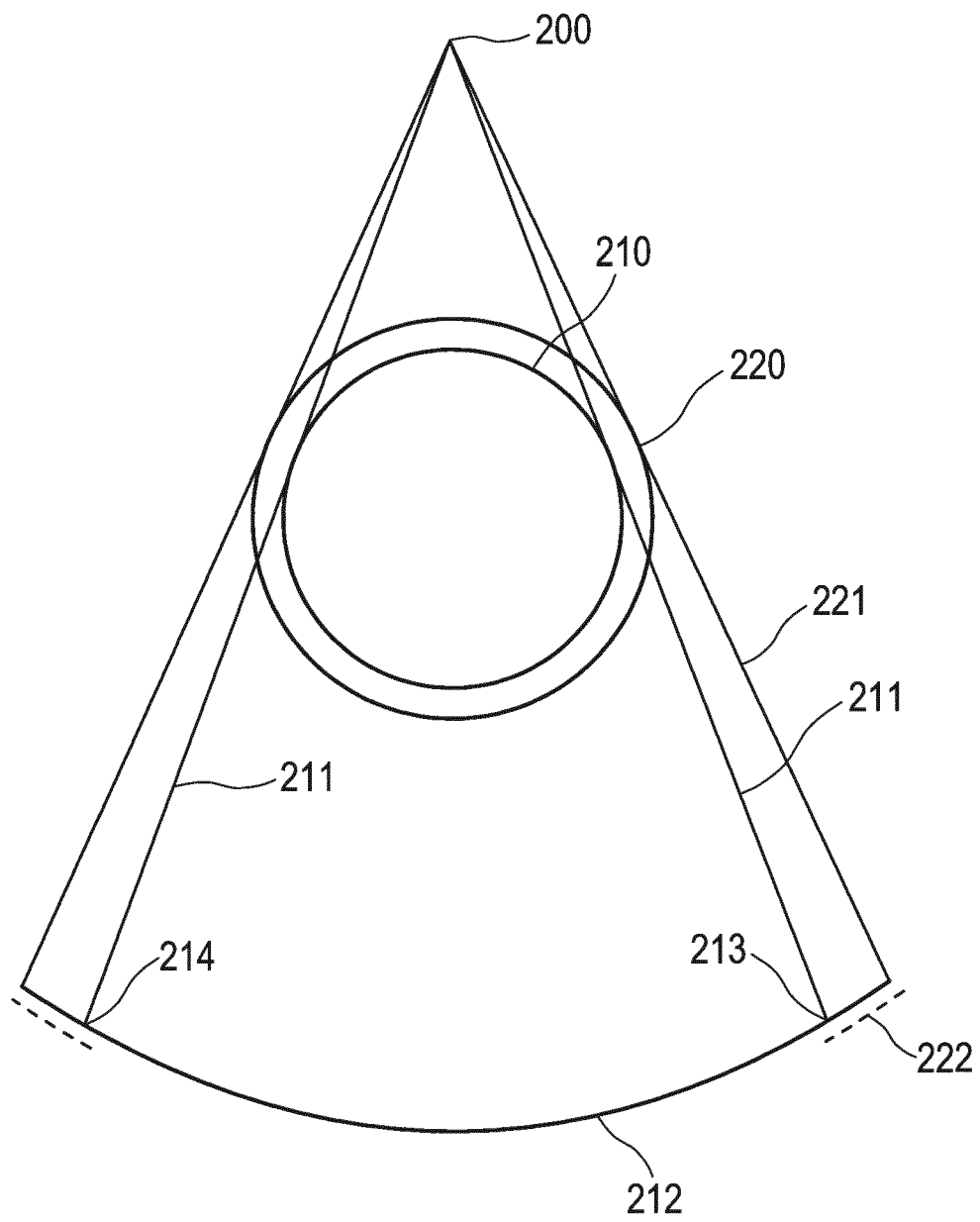
FIG. 2 shows schematically and exemplarily a connection between the angular extent of an imaging detector and an imaging FOV.

FIG. 2 shows a schematic and exemplary CT imaging system, wherein the CT imaging system comprises a radiation source 200 providing radiation to a detector 212. The detector 212 of the CT imaging system comprises a certain angular extent, i.e. extends along a certain part of a circle. The detector depicted in FIG. 2 comprises a plurality of detector elements along the angular extent of the detector, wherein boundary detector elements 213, 214 define the maximal angular extent of the detector. A radiation beam 211 extending from the radiation source 200 to the boundary detector elements 213, 214 defines the FOV 210 of the imaging unit 30. Since in the CT imaging system the imaging source 200 and the detector 212 are rotated, the FOV 210 corresponds to a circular or cylindrical region within the CT imaging system, wherein the FOV 210 thus corresponds to a circular or cylindrical FOV region within an image acquired by the CT imaging system.

It also becomes clear from FIG. 2 that parts of an object located outside the FOV 210 will only be imaged by the detector 212 under certain imaging angles and not over the full angular range of the CT imaging system. Thus, projection data acquired by imaging unit 30 comprising a limited FOV, i.e. a FOV being smaller than a bore provided by the imaging unit 30, comprises a full angular set of information with respect to parts of the patient 20 located inside the FOV 210, but only partial angular information with respect to parts of the patient 20 located outside the FOV 210.

The system 100 further comprises an estimated image data generation unit 120, wherein in this embodiment the estimated image data generation unit 120 comprises an image data isolation unit 121 and an outside projection data generation unit 122. The image data isolation unit 121 is adapted to isolate image data indicative of the part of the patient 20 located inside the imaging FOV 210. In this embodiment, the image data isolation unit 121 is adapted to reconstruct the provided projection data provided by the projection data providing unit 110 using a filtered back projection algorithm to obtain a truncated image. The isolated image data is then isolated from the truncated image by identifying a region in the truncated image corresponding to a region with a radius r, which may be a few percent smaller than the corresponding radius R of the imaging FOV 210. The identified region, i.e. a circular or a cylindrical region, is then isolated from the truncated image data and forms the isolated image data.

The outside projection data generation unit 122 is adapted to forward project the isolated image data to obtain forward projected isolated image data that is indicative of at least a part of the patient 20 located inside the FOV 210. The forward projection of the isolated image data is based on imaging settings like detector size, table pitch, number of projections, etc., that are preferably identical to the imaging settings of the imaging unit 30 during the acquisition of the provided projection data. In this embodiment, the outside projection data generation unit is adapted to generate the outside projection data by subtracting the projected isolated image data from the provided projection data. Accordingly, the outside projection data only comprises information that goes beyond the information of the projected isolated imaging data, i.e. of the region that goes beyond the region to which the isolated imaging data corresponds. Moreover, the outside projection data mainly comprises projection data indicative of parts of the patient 20 located outside the imaging FOV 210.

In this embodiment, the estimated image data generation unit 120 is further adapted to reconstruct the outside projection data based on an algorithm suitable for reconstructing incomplete sample projection data. Moreover, in this embodiment, the algorithm is a modified DART algorithm. The DART algorithm is modified such that in each iterative step of the DART algorithm, imaging values of an image generated during the iteration that correspond to a region of the imaging FOV 210 are set to zero. Particularly, imaging values of a region corresponding to the region of the isolated imaging data are set to zero. Moreover, in each iterative step the free pixels as defined in the DART algorithm described in the article "DART: A Practical Reconstruction Algorithm for Discrete Tomography" by K. Batenburg et al., IEEE Transactions on Image Processing, volume 20, pages 2542-2553 (2011) are restricted to a region in the image corresponding to a region outside the imaging FOV, in particular to a region corresponding to a region for which the outside projection data is indicative. Since the modified DART algorithm is especially suitable for reconstructing incomplete angular sample projection data, i.e. projection data as the outside projection data, the estimated image data will give a very accurate estimate on the boundaries of the part of the patient 20 located outside the imaging FOV 210. This is also illustrated in FIG. 3.

Figure 3:
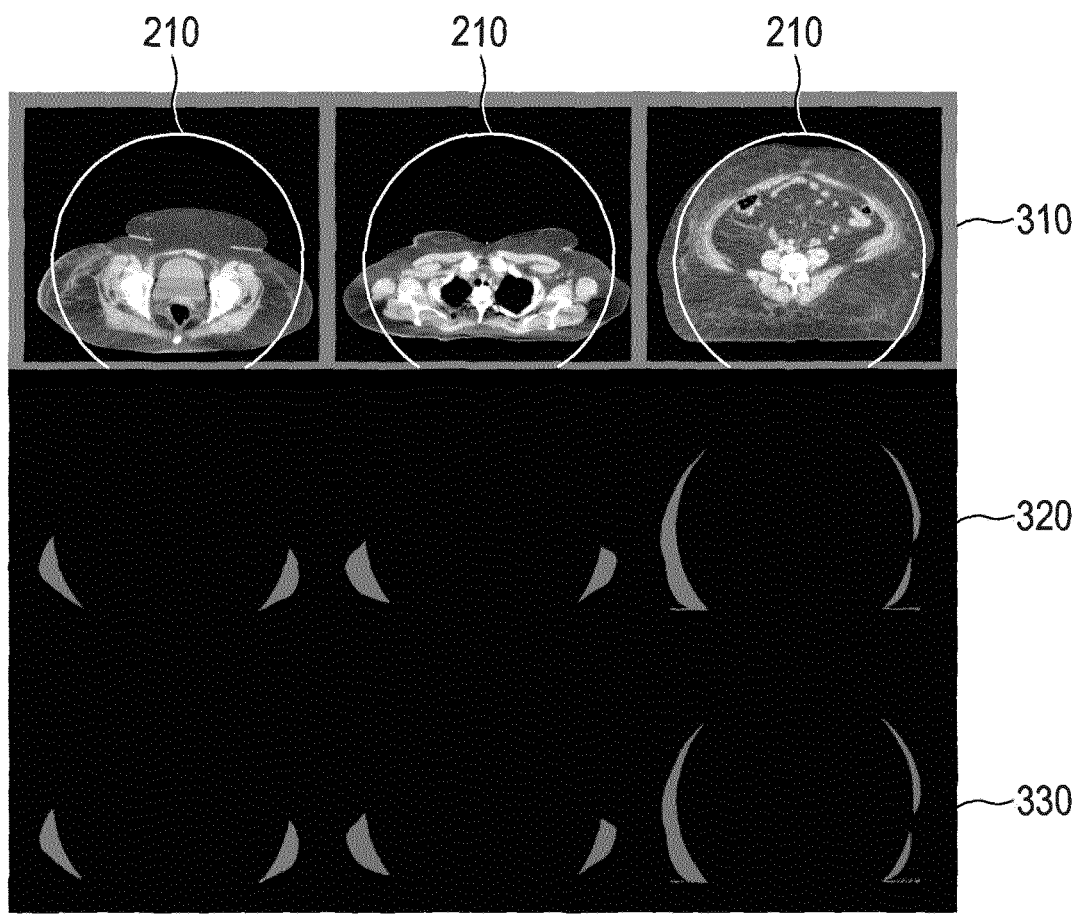
FIG. 3 shows images indicative of the performance of an embodiment of the system.

FIG. 3 shows, in the top row 310, three different images of different patients acquired using a CT imaging system. These images were used to generate simulated truncated projection data for a simulated CT imaging system with a simulated FOV. The circles 210 shown in the images correspond to the simulated imaging FOV of the simulated CT imaging system. The middle row 320 shows ideal estimates for two absorption coefficients—here, water and air—acquired from the above images of the parts of the patient located outside the simulated FOV. The bottom row 330 shows reconstructions of the parts of the patient located outside the simulated FOV reconstructed using the modified DART reconstruction algorithm as described above. It can be seen that the reconstruction provided by the DART algorithm is very close to the ideal estimates.

The system 100 further comprises a virtual projection data estimation unit 130 for estimating virtual projection data. The virtual projection data estimation unit 130 is adapted to estimate the virtual projection data by forward projecting the estimated image data. For the forward projection, a virtual imaging unit comprising a virtual detector is defined, as is explained in the following in more detail with respect to FIG. 2. The virtual imaging unit defined for estimating the virtual projection data comprises a virtual FOV 220 that extends beyond the imaging FOV 210, i.e. includes the imaging FOV 210. The extent of the virtual FOV 220 can be obtained by providing the virtual detector with virtual detector elements extending into an angular region 222 beyond the imaging detector 212, wherein this angular region 222 is shown in FIG. 2 as dashed line. A virtual radiation beam 221 extending from the imaging source 200 to a last virtual detector element of the virtual detector in angular direction then defines the extended virtual FOV 220. The virtual FOV 220 and therefore the virtual detector is defined such that all parts of the patient 20, in particular the parts of the patient 20 that were located outside the imaging FOV 210, are located inside the virtual FOV 220. In this embodiment, the virtual detector comprises virtual detector elements that are in an angular region 222 beyond the imaging detector and virtual detector elements in the angular region of the imaging detector that are adjacent to the virtual detector elements beyond the angular region of the imaging detector, i.e. the virtual detector comprises no virtual detector elements in the middle of the angular range as indicated by the dashed lines. This allows to reduce the computational effort necessary for estimating the virtual projection data. The virtual projection data estimated based on the defined virtual imaging unit comprises in this embodiment a full set of angular information on the estimated parts of the patient 20 located outside the imaging FOV 210.

The system 100 further comprises data fusion unit 140 for generating fused projection data. The virtual projection data estimated by the virtual projection data estimation unit 130 is fused with the provided projection data by the data fusion unit 140. Since in this embodiment the isolated image data corresponds to a region being smaller than the imaging FOV 210, the virtual projection data also comprises projection data that is provided by the provided projection data. Accordingly, in this embodiment, a set of projection data of the virtual projection data and a set of projection data of the provided projection data overlap. The data fusion unit 140 is in this embodiment adapted to scale the virtual projection data such that a difference between the overlapping projection data of the virtual projection data and the provided projection data is minimized. This allows for a smooth transition between the virtual projection data and the provided projection data. To fuse the projection data with the provided projection data, the data fusion unit 140 is adapted to extend the provided projection data by the virtual projection data, wherein in the overlapping regions the projection data of the provided projection data is used.

The system 100 further comprises a final image data reconstruction unit 150 for reconstructing a final image based on the fused projection data. Since the fused projection data comprises a full set of angular information on the patient 20, due to the virtual projection data incorporated into the fused projection data, artifacts in the final image can be minimized, i.e. the final image can be reconstructed with a very high image quality.

Although in above described embodiment a DART reconstruction algorithm is used for reconstructing the outside projection data, also other reconstruction algorithms like a TVR-DART algorithm can be used accordingly.

Although in the above embodiment the isolated image data corresponds to a region being smaller than the imaging FOV, in another embodiment the isolated image data can correspond to a region equaling the region of the imaging FOV. In this case no overlap between virtual projection data and the provided projection data is provided. To allow for a smooth transition, the data fusion unit is in this embodiment adapted to scale the virtual projection data such that a difference between adjacent projection data of the virtual projection data and the provided projection data is minimized.

Although in the above embodiment the virtual detector comprises virtual detector elements that are in an angular region beyond the imaging detector and only virtual detector elements in the angular region of the imaging detector that are adjacent to the virtual detector element beyond the angular region of the imaging detectors, in another embodiment the virtual imaging detector can also comprise only virtual detector elements that are in an angular region beyond the imaging detector, or also virtual detector elements across the whole angular extent of the imaging detector.

Although in the above described embodiment the estimated image data is estimated based on reconstructing the outside projection data based on an algorithm suitable for reconstructing incomplete sample projection data, in another embodiment, which is described in more detail in the following, the estimated image data can be generated based on a first image indicative of soft tissue in a part of the patient 20 located outside the imaging FOV 210 and a second image indicative of highly attenuating objects in the part of the patient 20 located outside the imaging FOV 210.

In this embodiment, the system components as described in accordance with FIG. 1 are the same as previously described, wherein in this embodiment only the estimated image data generation unit 120 is adapted to generate a first image and a second image, as described below. The first image is generated based on the outside projection data provided by the outside projection data unit 122 such that it is indicative of soft tissue in the part of the patient 20 located outside the imaging FOV 210. Soft tissue in a patient comprises, for instance, muscle tissue or organ tissue, like liver tissue. In this preferred embodiment, a support determination algorithm based, for instance, on the DART-algorithm described above is used for generating the first image based on the outside projection data.

The second image is generated such that the second image is indicative of highly attenuating objects in the part of the patient 20 located outside the imaging FOV 210. The highly attenuating objects can be, for instance, bone or metal objects inside the body of the patient 20. The algorithm used for generating, i.e. reconstructing, the second image based on the outside projection data can be any algorithm that is specifically suitable for reconstructing images comprising highly attenuating objects. In this preferred embodiment, a water cylinder fitting algorithm is used for reconstructing the second image.

Figure 4:
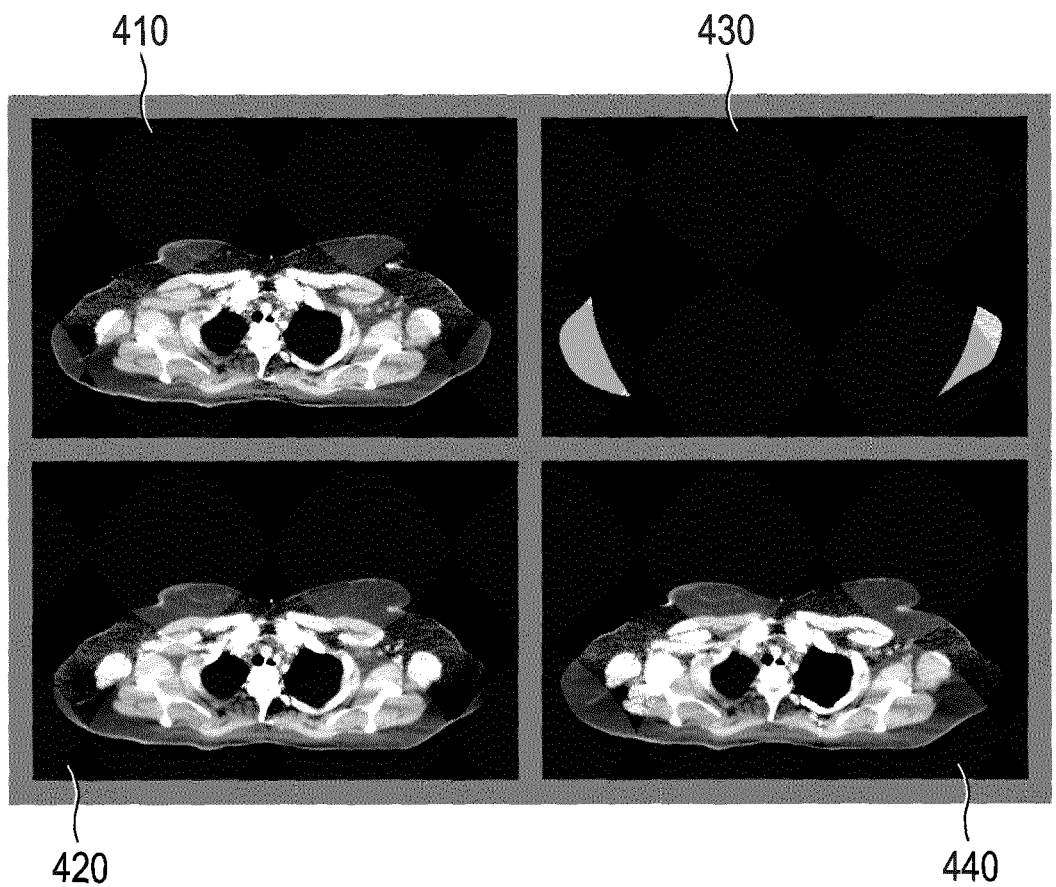
FIGS. 4 to 6 show exemplarily the performance of another embodiment of the system.
Figure 5:
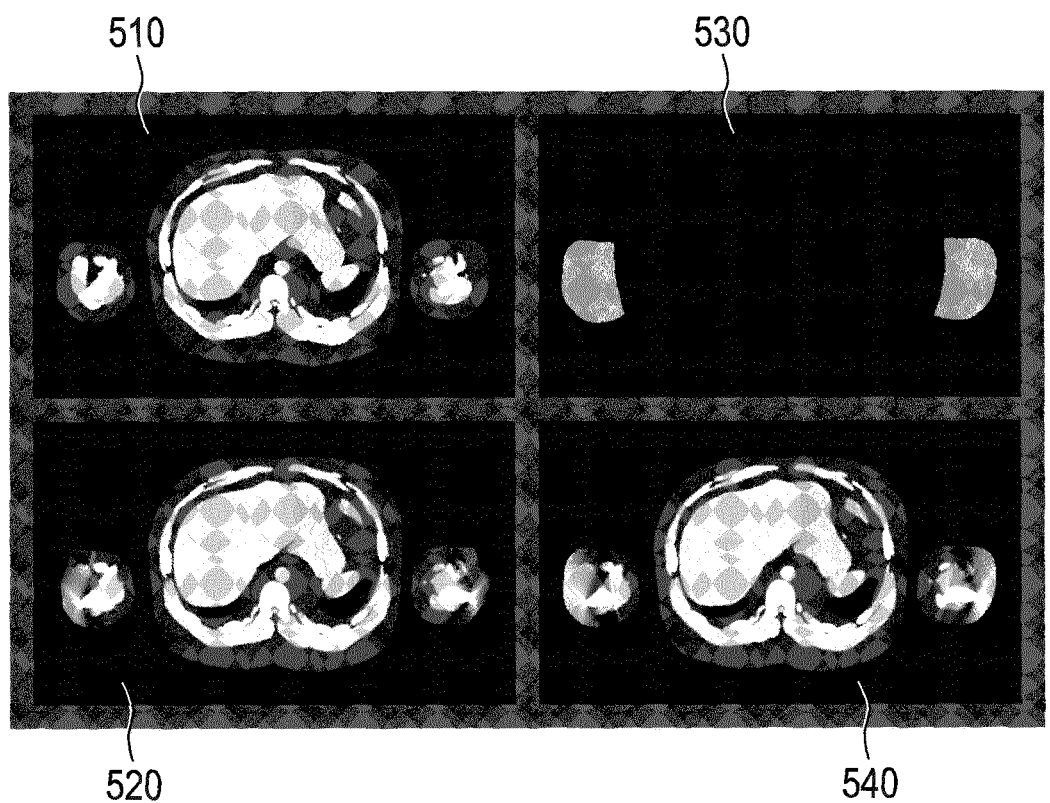

FIGS. 4 and 5 illustrate the suitability of the support estimation algorithm and the water cylinder fitting algorithm for estimating soft tissue or bone tissue. Image 410 shows a ground truth image for this example. An ideal soft tissue support determined directly from the ground truth image is shown in image 430. An image reconstructed based on the water cylinder fitting algorithm is shown in image 420 and an image reconstructed based on the ideal soft tissue support is shown in image 440. It is illustrated that for soft tissue the water cylinder fitting algorithm provides a reconstruction result with stronger truncation artifacts than an image reconstructed based on the ideal soft tissue support. Accordingly, it is shown that an algorithm based on an accurately estimated support can lead to more accurate results than the water cylinder fitting algorithm in case of soft tissue.

In FIG. 5 a ground truth image 510 is provided based on a patient phantom, wherein in this case the part of the phantom outside a simulated FOV comprises bone. Image 530 again shows the ideal soft tissue support. Further, image 520 again shows an image reconstructed using the water cylinder fitting algorithm, and image 540 shows an image reconstructed using the ideal soft tissue support. In both images 520, 540 more severe artifacts and image truncations can be found in the part of the phantom that is located outside the simulated FOV. It is illustrated that the delineation of the parts of the phantom outside the simulated FOV are much better for the image reconstructed using the ideal soft tissue support 540, while the transition between the part of the phantom located outside the simulated FOV and the part of the phantom located inside the simulated FOV is much less affected by artifacts for image based on the water cylinder fitting algorithm shown in image 520. Moreover, it is shown that that even if the ideal soft tissue support is known, artifacts resulting from the present bone have to be expected in the image reconstructed using the ideal soft tissue support, wherein the artifacts are more severe than the artifacts shown in image 440.

The estimated image data generation unit 120 is in this embodiment further adapted to fuse the first image and the second image. In this embodiment, the first and the second image are fused by copying the image values of the second image that are beyond a certain image value threshold, preferably beyond 200 Hounsfield units, to the first image. Alternatively, the second image can be segmented using known segmentation algorithms, and certain segmented parts of the second image, i.e. the segmented parts comprising the highly attenuating object, can be used to replace the corresponding parts in the first image. The estimated image data provided by the estimated image data generation unit 120 refers in this embodiment then to the image acquired from the fusion of the first and the second image as described above.

Figure 6:
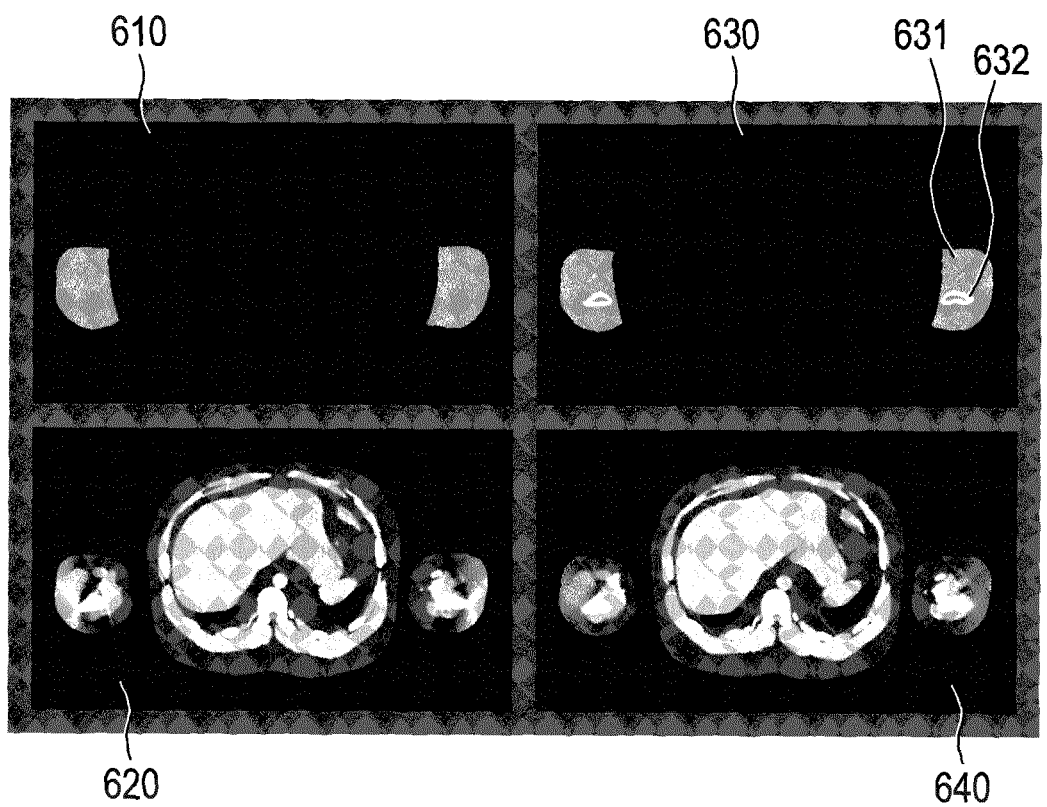

FIG. 6 shows illustrative images provided by the above described embodiment. Image 610 on the top left shows for the ground truth image acquired from a phantom case the ideal soft tissue support directly derived from the ground truth image. Image 630 on the top right shows an example for the estimated image data comprising image data 631 from the first image and image data 632 from the second image, i.e. image data corresponding to bone. Image 620 on the bottom left shows again the image 540 of FIG. 5 obtained from reconstructing the ideal soft tissue support, whereas image 640 on the bottom right shows an example of the final image which is reconstructed based on the estimated image data shown in image 630. It is clearly illustrated that artifacts in the image 640, reconstructed based on the above described algorithm, are strongly reduced with respect to image 620.

Figure 7:
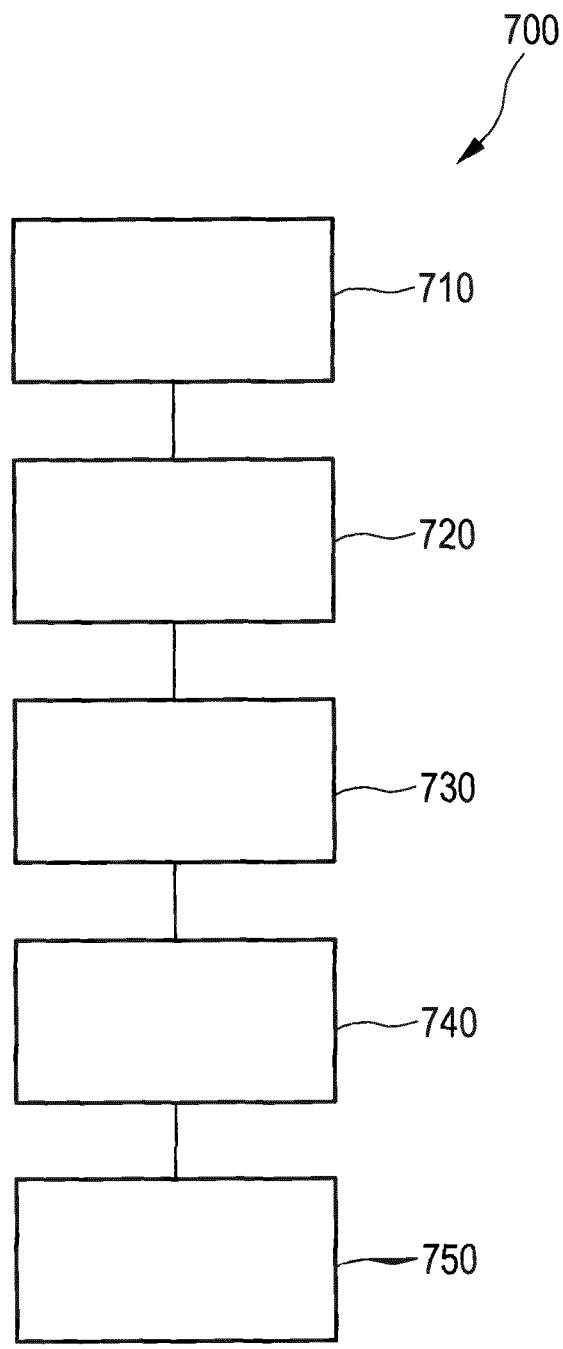
FIG. 7 shows a flowchart exemplarily illustrating an embodiment of a method for reconstructing an image of an object.

FIG. 7 shows a flowchart exemplarily illustrating an embodiment of a method for reconstructing an image of an object. The method 700 comprises a first step 710 of providing projection data of an object. The projection data has in this embodiment been acquired by a CT imaging system, wherein the CT imaging system comprises an imaging FOV 210. The method 700 further comprises a step 720 of generating estimated image data indicative of a part of a patient 20 located outside the imaging FOV 210 based on the provided projection data. Moreover, in step 730 of method 700, virtual projection data is estimated. The virtual projection data is estimated by forward projecting the estimated image data based on virtual settings of a virtual imaging unit comprising a virtual FOV 220. Further, in step 740, the fused projection data is generated based on a fusion of the provided projection data with the virtual projection data, wherein in step 750 a final image of the patient 20 is reconstructed based on a fused projection data.

Although in the above described embodiment a water cylinder fitting algorithm is used for reconstructing the second image, in another embodiment also other algorithms can be used. In a preferred embodiment, the second image is reconstructed by using the first image as estimated image data and generating virtual projection data based in the estimated image data, i.e. first image data, wherein a final image is then reconstructed based on the fused projection data obtained from the virtual projection data and the final image is used as second image. Preferably, in this embodiment a DART-algorithm is used for estimating the first image, i.e. the estimated image data.

FIG. 8 shows a schematically and exemplarily a further embodiment of a system for reconstructing an image of an object. In this embodiment, the system 1000 further comprises a slice thickness determination unit 160. Note, that this system 1000 is partly similar to the system 100 described above with reference to FIG. 1. Therefore, the system 1000 according to the further embodiment also comprises a projection data providing unit 110, an estimated image data generation unit 120, a virtual projection data estimation unit 130, a data fusion unit 140 and a final image data reconstruction unit 150.

The estimated image data generation unit 120 comprises an image data isolation unit 121 and an outside projection data generation unit 122.

It is foreseen that for this system 1000 the units are arranged similarly as with respect to the system 100 described in earlier and later embodiments.

This system 1000, however, comprises the slice thickness determination unit 160. The slice thickness determination unit 160 is configured for determining or setting an imaging FOV slice thickness and a virtual FOV slice thickness.

The imaging FOV slice thickness corresponds to a slice thickness of projection data in the imaging FOV 210. The virtual FOV slice thickness corresponds to a slice thickness of virtual projection data in the virtual FOV 220.

The slice thickness determination unit 160 is further configured to set the virtual FOV slice thickness bigger than the imaging FOV slice thickness. In alternative wording, the slice thickness determination unit is configured to set the imaging FOV slice thickness smaller than the virtual FOV slice thickness.

The data fusion unit 140 is configured to fuse projection data that corresponds to the imaging FOV slice thickness with virtual projection data that corresponds to the imaging FOV slice thickness value, where said latter slice thickness is larger than said former slice thickness.

This allows the final data reconstruction unit 150 to generate a final image where projection data in the imaging FOV 210 is displayed at a smaller slice thickness than virtual projection data in the virtual FOV 220.

Preferably, the final data reconstruction unit 150 is configured to reconstruct a final image of the object, wherein the projection data is reconstructed over an imaging FOV slice thickness and the virtual projection data is reconstructed over a virtual FOV slice thickness, wherein the imaging FOV slice thickness is smaller than the virtual FOV slice thickness.

Having an imaging FOV slice thickness that is smaller than a virtual FOV slice thickness has as advantage that in the virtual FOV 220 artefacts may be reduced to a minimum while in the imaging FOV 210 the final image may still be displayed with a desired slice thickness.

In other words, the system 1000 comprising the slice thickness determination unit 160 allows generating and displaying a final image wherein in an inner region of the final image, data is projected with a low slice thickness. Data in an outer region of the final image is projected with a high slice thickness. The inner region corresponds with the imaging FOV 210 and the outer region corresponds with the virtual FOV 220. Data in the inner region corresponds with projection data. Data in the outer region corresponds with virtual projection data.

This reduces artefacts in the virtual FOV/outer region 220 as here use can be made of a higher slice thickness.

FIG. 9 shows a flowchart exemplarily illustrating an embodiment of a method for reconstructing an image of an object using a slice thickness determination unit 160.

The method 800 comprises a first step 810 of providing projection data of an object. The projection data has in this embodiment been acquired by a CT imaging system, wherein the CT imaging system comprises an imaging FOV 210.

The method 800 further comprises a step 820 of generating estimated image data indicative of a part of a patient 20 located outside the imaging FOV 210 based on the provided projection data. Moreover, in step 830 of method 800, virtual projection data is estimated.

The virtual projection data is estimated by forward projecting the estimated image data based on virtual settings of a virtual imaging unit comprising a virtual FOV 220.

In step 835, by means of the slice thickness determination unit 160, an imaging FOV slice thickness is determined corresponding to the slice thickness of the image projection data in the imaging FOV 210. The slice thickness determination unit 160 also determines a virtual FOV slice thickness that corresponds to the virtual FOV 220.

Generally, the imaging FOV slice thickness is set smaller than the virtual FOV slice thickness.

Further, in step 840, the fused projection data is generated based on a fusion of the provided projection data with the virtual projection data, wherein in step 850 a final image of the patient 20 is reconstructed based on a fused projection data taking into account the respective slice thicknesses.

In step 850 the final image of the patient is reconstructed by taking into account the imaging FOV slice thickness for the projection data and the virtual FOV slice thickness for the virtual projection data. In other words, a final image is reconstructed wherein the projection data in the imaging FOV have a low slice thickness and the virtual projection data in the virtual FOV has a high slice thickness. Low and high means that the imaging FOV slice thickness is smaller than the virtual FOV slice thickness.

For this embodiment, the imaging FOV 210 has a radius $R_{210}$. Furthermore, two additional radii are defined, viz. $R_1 \geq R_{210}$ and $R_2 > R_1$ (in some cases it might also be desired that $R_1 < R_{210}$). Slice thickness for projection data within the imaging FOV 210 has been set to $t_{210}$ and an acceptable slice thickness for the virtual FOV 220 is specified as $t_{220}$.

In a first step, data are reconstructed in the entire FOV, i.e. in the imaging FOV 210 and the virtual FOV 220. Here, the obtained slice thickness is $t_{210}$ and a correction algorithm is applied for minimizing artefacts in the virtual FOV 220.

In the next step, slice thicknesses are partially increased for data within the virtual FOV 220. Here, the target thickness t(R) depends on the distance R of a particular object point from the rotation axis.

In particular, $$t(R) = \begin{cases} t_{210} & \text{if } R \leq R_1 \\ t_{210} + (R - R_1)\frac{(t_{220} - t_{210})}{(R_2 - R_1)} & \text{if } R_1 \leq R \leq R_2 \\ t_{220} & \text{if } R \geq R_2 \end{cases}$$

The targeted thickness t(R) for object points at radius R can then be obtained by a conventional smoothing step.

Although in the above described embodiment a water cylinder fitting algorithm is used for reconstructing the second image, in another embodiment also other algorithms can be used.

Although in the above described embodiments the estimated image data generation unit generates the estimated image data based on the provided projection data or the outside projection data, in other embodiments the estimated image data generation unit can also be adapted to generate the estimated image data based on the fused projection data provided by the data fusion unit. In this embodiment, the image of the object is iteratively reconstructed, i.e. reconstructed by repeating the processes provided by the estimated image data generation unit, the virtual projection data estimation unit and the data fusion unit based on the fused projection data acquired during a previous iterative step. The iteration can be continued until an abort criterion is reached, wherein the final image generation unit generates the final image based on the fused projection data provided by the last iteration. The abort criterion can be a threshold for a difference between fused projection data of two consecutive iterations, wherein the iteration is aborted when the difference is smaller than the threshold.

Although in the above embodiments, the imaged object is a patient and the provided image is a medical image, in other embodiments the object can be an animal or even an inanimate object like, for instance, a suitcase. Thus, although in the above described embodiments the system is adapted to be used in a medical imaging procedure, in other embodiments the system can be adapted to be used, for instance, in a security procedure at an airport or a custom office.

Although in the above embodiments the imaging unit is a CT imaging system, in other embodiments the imaging unit can comprise another projection data acquiring system, like for instance, a C-arm X-ray system.

Current and future CT scanners, i.e. CT imaging units, have an imaging FOV which is smaller than the bore size of the scanners. This can lead to patients or other objects being placed partly outside the imaging FOV. In cases in which such misplacements occur, artifacts in the reconstructed images can occur.

In the present invention it is proposed to use an algorithm consisting of the following steps to decrease the artifacts in a reconstructed image. In a first step an image reconstruction is performed based on measurement data, i.e. provided projection data, measured by a CT imaging unit. In a second step the result from the reconstruction, i.e. a truncated image, is used as a basis to take data inside a cylinder with radius r, wherein the radius r is smaller than or equal to the radius R of the imaging FOV. Preferably, the radius r is a few percent smaller than the radius R of the imaging FOV. In a third step the data from inside the cylinder, i.e. isolated image data, is forward projected and subtracted from the measurement data, i.e. provided projection data, wherein imaging settings of this virtual forward projection should be identical or similar to those of the original measurement. In a fourth step the subtracted data, i.e. estimated image data, is used as input for a modified DART reconstruction that gives a first estimate of the scanned object outside the imaging FOV, i.e. results in estimated image data. In the fifth step the result obtained from the DART reconstruction, is forward projected to generate virtual projection data, wherein a virtual detector is used having columns, i.e. detection elements, outside of the original detector in the angular direction. In particular, the virtual detector has a sufficient number of columns, i.e. detector elements, to cover an extended FOV, i.e. virtual FOV, that includes the parts of the object located outside the imaging FOV. In a sixth step, the data obtained in the fifth step, i.e. the virtual projection data, is fused with the measurement data, i.e. provided projection data, and in a seventh step a reconstruction is performed based on the fused projection data obtained in the sixth step. Optionally, in an eighth step the second to sevenths steps are iterated, wherein the result of the sixth step, i.e. the fused projection data, is used as input for the second step. Alternatively, the final image obtained in the seventh step can be used as final reconstruction result. Further alternatively, the final image obtained in the seventh step can be used as starting image for an MLIR reconstruction. Preferably, in this case the measurement data, i.e. provided projection data, is used in the MLIR reconstruction.

In the first step the initial reconstruction can be performed by using a filtered back projection algorithm. In this case, the measurement data can be modified such that artifacts in the imaging FOV region are minimized, which can be achieved, for instance, by using a point reflection algorithm.

The DART reconstruction used in the fourth step refers to a class of discrete tomography reconstruction algorithms, where it is assumed that the object to be reconstructed consists of a limited set of absorption coefficients. Typical numbers of chosen absorption coefficients are two or three. Typical absorption coefficients chosen are those of air and water, air and fat, or air, water and bone or air, fat and bone. The DART algorithm is an example of such a discrete tomography algorithm, but the method described above also works with other discrete tomography algorithms like a TVR-DART algorithm. A DART algorithm uses iterative methods for solving discrete tomography problems. For the above disclosed method the DART algorithm or the TVR-DART algorithm are modified, wherein modification means that in each iteration step data within a cylinder of radius r defined in the second step is set to zero and also that a set of free pixels used in the DART algorithm is restricted to an area outside the cylinder with radius r.

In the fifth step, for forward projecting the image data acquired by the DART reconstruction, a virtual detector is defined. The virtual detector extends beyond the original detector, i.e. imaging detector. The outermost columns, i.e. detector elements, of the virtual detector are far enough outside to cover the entire object within the virtual FOV. The virtual projection data acquired in this step is an approximation towards what the original measurement data would look like if the detector were larger and if the scanned objected consisted only of the region outside the cylinder with radius r.

The original measurement data, i.e. provided projection data, contains truncated projections due to the limited imaging FOV of the imaging unit. Extended projection data, i.e. virtual projection data, covering the whole object can therefore be obtained by fusing the measurement data with the virtual projection data. Since preferably some columns, i.e. detector elements, of the virtual detector will overlap with columns, i.e. detector elements, of the original detector, i.e. imaging detector, it is most convenient to apply a smooth transition in this overlapping region when extending the measurement data, i.e. provided projection data, by the virtual projection data. For detector elements, which exist either on the original or the virtual detector, projection values resulting from a weighted mean of the virtual projection data and the provided projection data are used. Furthermore, it is preferred to perform a scaling of the virtual projection data before fusing, for instance, by scaling the virtual projection data such that it is maximal similar to the provided projection data in the overlapping region in a least square sense. This reduces transition artifacts in the final reconstruction.

Projection truncation is a well-known problem in CT imaging. If the object to be scanned is not for all projections completely inside the x-ray fan, artifacts occur during reconstruction especially at the boundary of an imaging FOV. A number of methods have been suggested to reduce these artifacts or even more sophisticated to allow an approximate reconstruction of the object outside the imaging FOV. Two known methods for reducing imaging artifacts in these cases are the water cylinder fitting algorithm and the support estimation. Both aim for the extension of the truncated projections followed by a conventional filtered back projection.

Water cylinder fitting algorithms solve the problem in a projection domain, wherein water cylinders are fitted to each truncated projection that best fit to the outermost parts of the considered projection. One very robust version of support estimation, on the other hand, aims for the estimation of a support of the object, i.e. to estimate the boundaries of the scanned object outside the FOV. It is assumed that the support comprises a homogenous material, for instance, water. With this estimation, a forward projection of the support can be performed, generating synthetic projection data that is used for the extension of the truncated projections. It can be shown that the support estimation outperforms the water cylinder fitting algorithm. Good results with support estimation can be achieved if soft tissue can be found outside the imaging FOV. If, for example, parts of an arm including the bones are positioned outside the imaging FOV, severe artifacts occur when using the support estimation algorithm.

The invention provided here is able to considerably reduce artifacts that occur during the reconstruction of an object if the truncated part of the object, i.e. the part of the object located outside the imaging FOV, comprises bone structures.

An embodiment of the invention suggested here to improve the image quality of the image reconstruction is based on an improvement of the support estimation using an image obtained from, e.g., a water cylinder fitting algorithm. Since the highly attenuating bone structures are reasonably well reconstructed by the water cylinder fitting algorithm, the approach is to copy the content of a water cylinder fitting algorithm image outside the FOV beyond a certain threshold, for instance, 200 Hounsfield units, to a support estimation image reconstructed using a support estimation algorithm. For such an approach, artifacts can be considerably reduced by the improvement of the provided support and an image quality is much better than for a reconstruction based on standard support reconstruction algorithms as well as based on a water cylinder fitting reconstruction algorithm.

Other variations to the disclosed embodiments can be understood and effected by those skilled in the art and practicing the planned invention from the study of the drawings, the disclosure and the appendant claims.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutual different dependent claims does not indicate that a combination of these measures cannot be used to advantage.

Procedures like the generating of an estimated image data or the estimating of virtual projection data performed by one or several units or devices can be performed by any other number of units or devices. The procedures and/or the operations of the system can be implemented as program code means of a computer program and/or as dedicated hardware. A computer program may be stored/distributed in a suitable medium, such as any optical storage medium or a solid state medium, supplied together with or as part of other hardware, but might also be distributed in other forms, such as via the Internet or other wired or wireless telecommunication systems.

Any reference signs in the claims should not be construed as limiting the scope.

The invention relates to a system for reconstructing an image of an object. The system comprises means providing projection data acquired by an imaging unit, like a CT system, with an FOV, means generating estimated image data indicative of a part of an object located outside the FOV, means estimating virtual projection data based on virtual settings of a virtual imaging unit comprising a virtual FOV, means generating fused projection data by fusing the provided projection data with the virtual projection data, and means reconstructing a final image. This allows basing the reconstruction on a complete set of projection information for the object and thus providing an image with a high image quality.

The invention claimed is:

1. A system for reconstructing an image of an object, comprising:
   a memory that stores a plurality of instructions; and
   a processor assembly coupled to the memory and configured to execute the plurality of instructions to:
      provide projection data of the object acquired by using an imaging system comprising an imaging field of view (FOV);
      generate estimated image data indicative of a part of the object located outside the imaging FOV based on the provided projection data;
      estimate virtual projection data, wherein the virtual projection data is estimated by forward projecting the estimated image data based on virtual settings of a virtual imaging system, wherein the virtual imaging system comprises a virtual FOV, wherein the part of the object located outside the imaging FOV is located inside the virtual FOV;
      determine an imaging FOV slice thickness corresponding to the slice thickness of the projection data in the imaging FOV;
      determine a virtual FOV slice thickness corresponding to the slice thickness of the virtual projection data in the virtual FOV, wherein the imaging FOV slice thickness is smaller than the virtual FOV slice thickness;
      fuse the provided projection data that corresponds to the imaging FOV slice thickness with the virtual projection data that corresponds to the virtual FOV slice thickness; and
      reconstruct a final image of the object based on the fused projection data.

2. The system according to claim 1, wherein the generating of estimated image data comprises a) generating a first image based on the provided projection data, wherein the first image is indicative of a boundary of the part of the object located outside the imaging FOV, generating a second image based on the provided projection data, wherein the second image is indicative of a high attenuation object in the part of the object located outside the imaging FOV, and fusing the first image with the second image, or b) reconstructing the provided projection data based on an algorithm suitable for reconstructing incomplete sampled projection data.

3. The system according to claim 2, wherein for generating the second image a water cylinder fitting algorithm is used.

4. The system according to claim 2, wherein the estimated image data generation unit is further adapted to segment the second image, wherein the second image is fused with the first image by replacing parts of the first image with at least one segment indicative of the highly attenuating object in the part of the object located outside the imaging FOV.

5. The system according to claim 2, wherein the reconstruction of the provided projection data is performed based on an iterative discrete tomography algorithm.

6. The system according to claim 5, wherein the iterative discrete tomography algorithm is a DART algorithm or a TVR-DART algorithm.

7. The system according to claim 6, wherein in each iterative step of the DART algorithm or TVR-DART algorithm iterative image data is generated and a part of the iterative image data in a region corresponding to the imaging FOV or a region included in the imaging FOV is set to an image value of zero.

8. The system according to claim 6, wherein in each iterative step of the DART algorithm an iterative image data is generated and a set of free pixels is determined in the iterative image data, wherein the set of free pixels is restricted to a region corresponding to a region outside the imaging FOV or to a region outside a region included in the imaging FOV.

9. The system according to claim 1, wherein the estimated image data generation unit is further adapted to generate the estimated image data based on the fused projection data provided by the data fusion unit.

10. The system according to claim 1, wherein the estimated image data generation unit further comprises:
an image data isolation unit for isolating image data indicative of a part of the object located within the imaging FOV, wherein for isolating the isolated image data a truncated image is reconstructed from the projection data and the isolated image data is isolated from the truncated image;
an outside projection data generation unit for generating outside projection data indicative of a part of the object located outside the imaging FOV, wherein for generating the outside projection data the isolated image data is forward projected and the outside projection data is generated based on the forward projected isolated image data and the provided projection data, wherein the estimated image data is generated based on the outside projection data.

11. The system according to claim 10, wherein the image data isolation unit is adapted to isolate the isolated image data from the truncated image by isolating a region of the truncated image corresponding to the imaging FOV or a region included in the imaging FOV.

12. The system according to claim 10, wherein the image data isolation unit is adapted to forward project the isolated image data based on imaging settings corresponding to the imaging settings of the imaging unit that have been used during the acquisition of the projection data, and the outside projection data generation unit is adapted to generate the outside projection data based on subtracting the forward projected isolated image data from the provided projection data.

13. The system according to claim 1, wherein the virtual imaging unit used for forward projecting the estimated image data comprises a virtual detector, wherein the virtual detector comprises an increased angular range compared to a detector of the imaging unit that has been used for acquiring the projection data such that the virtual FOV is increased due to the increased angular range.

14. A method for reconstructing an image of an object, comprising:
providing projection data of an object, wherein the projection data has been acquired by using an imaging unit comprising an imaging FOV;
generating estimated image data indicative of a part of the object located outside the imaging FOV based on the provided projection data;
estimating virtual projection data by forward projecting the estimated image data based on virtual settings of a virtual imaging unit, wherein the virtual imaging unit comprises a virtual FOV, wherein the part of the object located outside the imaging FOV is located inside the virtual FOV;
determining an imaging FOV slice thickness corresponding to the slice thickness of the projection data in the imaging FOV;
determining a virtual FOV slice thickness corresponding to the slice thickness of the virtual projection data in the virtual FOV, wherein the imaging FOV slice thickness is smaller than the virtual FOV slice thickness;
fusing the provided projection data that corresponds to the imaging FOV slice thickness with the virtual projection data that corresponds to the virtual FOV slice thickness; and
reconstructing the final image of the object based on the fused projection data.

15. A non-transitory computer-readable medium for storing executable instructions that, when executed, cause the method according to claim 14 to be performed.

* * * * *